United States Patent [19]

Coonrod

[11] 4,276,337
[45] Jun. 30, 1981

[54] REINFORCED PLASTIC GRATING ARTICLES AND CONTINUOUS PROCESS FOR FORMING SAME

[75] Inventor: William C. Coonrod, Richardson, Tex.

[73] Assignee: Fibergrate Corporation, Dallas, Tex.

[21] Appl. No.: 20,164

[22] Filed: Mar. 13, 1979

Related U.S. Application Data

[62] Division of Ser. No. 889,392, Mar. 23, 1978, Pat. No. 4,164,439.

[51] Int. Cl.³ .................. B32B 3/10; B65H 81/00; B29D 7/14
[52] U.S. Cl. .................. 428/134; 52/309.1; 52/309.16; 52/660; 156/162; 156/180; 156/245; 264/137; 264/263; 264/163; 428/542
[58] Field of Search ............... 428/134, 135, 107, 295, 428/119, 225, 107, 108, 113, 114; 156/500, 433, 439, 440, 441, 443, 434, 555, 581, 245, 242, 169, 166, 180, 181, 175, 393; 425/116, 122, 123, 348, 347, 364 R; 264/103, 137, 136, 257, 258, 263, 339, 371; 52/660, 661, 664, 662, 676, DIG. 7, 309.16, 309.1

[56] References Cited

U.S. PATENT DOCUMENTS

| 2,866,230 | 12/1958 | Holte | 156/443 |
|---|---|---|---|
| 3,034,566 | 5/1962 | McKay | 156/180 |
| 3,296,055 | 1/1967 | Wilkins | 156/433 |
| 3,425,884 | 2/1969 | Brinkema | 156/433 |
| 3,755,054 | 8/1973 | Medney | 156/500 |
| 3,772,126 | 11/1973 | Myers | 156/500 |
| 3,878,591 | 4/1975 | Jense | 156/439 |
| 4,080,232 | 3/1978 | Friedrich | 156/440 |

Primary Examiner—Michael W. Ball
Attorney, Agent, or Firm—Richards, Harris & Medlock

[57] ABSTRACT

A process and apparatus for the continuous production of fiber reinforced plastic grating articles is provided wherein continuous strands of fibers are coated with a thermosetting plastic resin material and woven into a grate pattern defined by upper and lower molding teeth arranged on continuous upper and lowr molding tracks. The molding tracks rotate and cause the molding teeth to mesh, forming a molding cavity, wherein heat is applied to set the plastic resin. The fiber reinforced plastic grating articles formed by this process and apparatus have a unique cross-sectional configuration and arrangement of fibers providing for increased strength and reduced resin usage.

7 Claims, 18 Drawing Figures

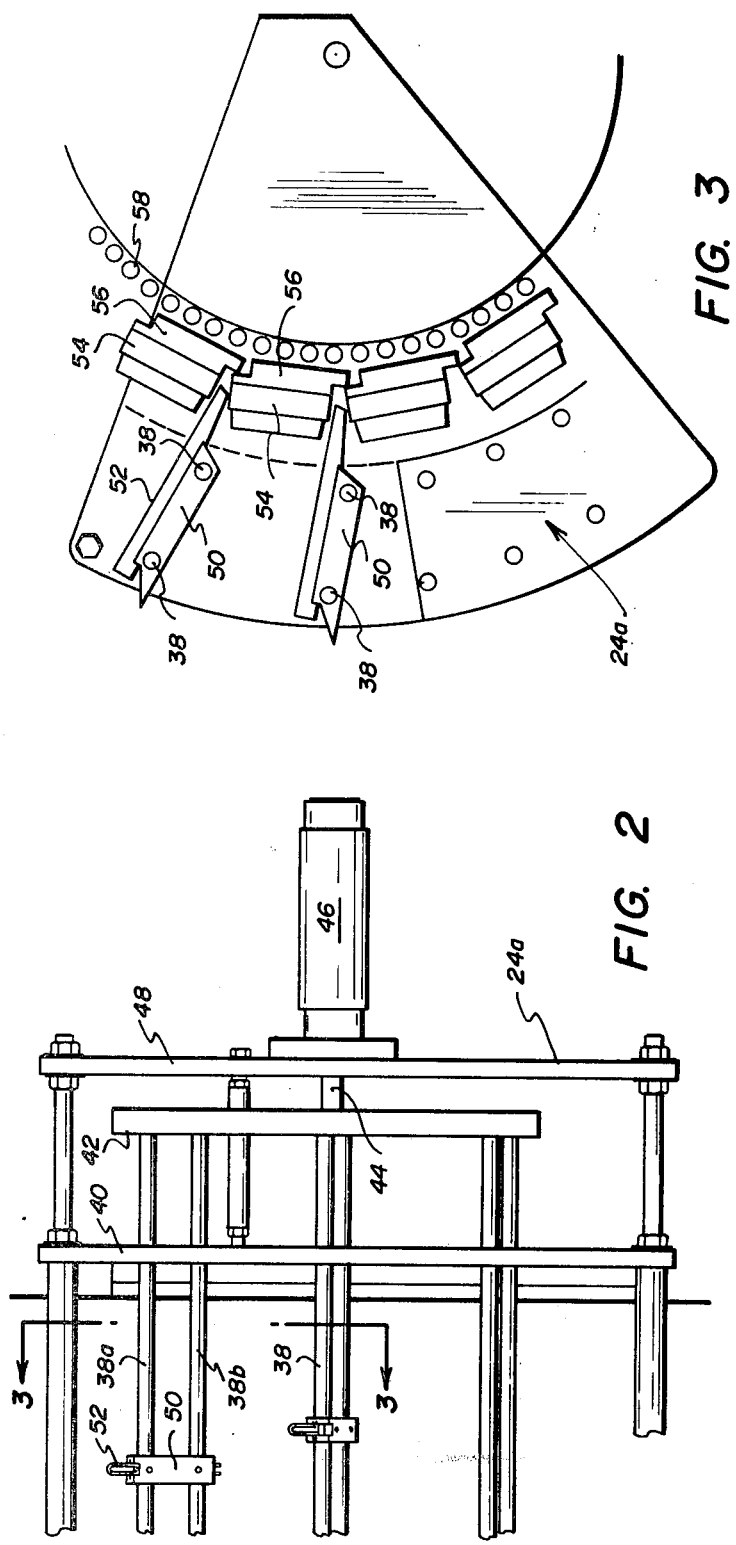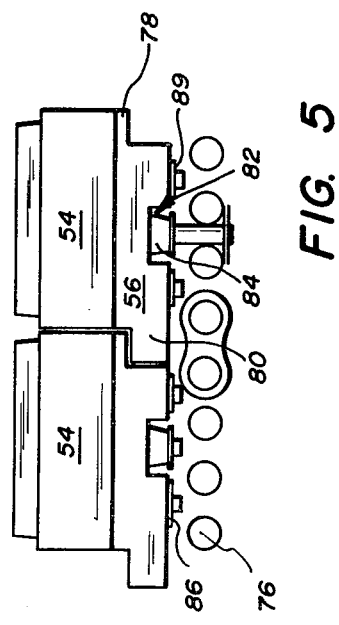

REINFORCED PLASTIC GRATING ARTICLES AND CONTINUOUS PROCESS FOR FORMING SAME

This is a division of application Ser. No. 889,392 filed Mar. 23, 1978, now U.S. Pat. No. 4,164,439.

BACKGROUND OF THE INVENTION

The present invention relates to the fabrication of fiber reinforced plastic grates, and similar articles. In another aspect, the present invention relates to a process for producing fiber reinforced grating on a continuous basis. In a further aspect, the present invention relates to an apparatus for the continuous production of fiber reinforced grating materials. In a still further aspect, the present invention relates to fiber reinforced plastic grating articles having a cross-sectional configuration and arrangement of fibers within the plastic which provides for increased strength and reduced usage of plastic resin materials. The present invention also relates to the fabrication of channels, bars and other open structural shapes of fiber reinforced plastic.

Corrosion resistant, electrically non-conductive, grate articles have many applications including for example, catwalks, flooring, and the like, in industrial environments where chemical corrosion or high power electrical equipment and lines make conventional metallic grating articles undesirable, or unsafe. The term "grating articles" as employed herein refers to any structure having longitudinal span members running substantially parallel to one another and interconnected by transverse tie members, also spaced parallel to one another, so as to form a grid-like structure. Grating materials having anticorrosion and non-conductive properties are constructed by coating conventional metallic grid structures with non-corrosive or non-conductive materials or by fabricating plastic resins, reinforced with fibrous materials, into grate structures. It is to the latter type of grate articles that the present invention is directed.

Until recently, fiber reinforced grate structures were manufactured on a batch basis normally employing open faced molds. Basically, conventional fiber reinforced grates are produced by pouring thermosetting plastic resin materials into the mold, filling the grooves therein. Next reinforcing fibers are manually or machine laced into the grooves of the openfaced grating mold which, depending upon the configuration of the grating structure, can resemble a waffle iron pattern, for example. The entire open-faced mold is then heated causing the thermosetting plastic to set, resulting in a fiber reinforced grate structure having the dimensions of the open-faced mold in which it was produced. The fiber reinforced grating is then removed from the mold and the process is repeated to obtain a second fiber reinforced plastic grate structure. This batch type production process has many inefficiencies, a major one of which is the fact that labor costs involved are fairly high because of the manual lacing of the reinforcing fibers and the necessity to produce the grate structures one at a time on a batch basis, allowing for the curing of the plastic resin materials before the mold can be refilled and the process repeated.

Another disadvantage attending fiber reinforced plastic grate structures produced in the past is that fairly large amounts of relatively expensive plastic resin must be employed in order to attain the strength and rigidity characteristics required in various applications of the grate structure. Generally, the cross-sectional configuration of the span members and transverse tie members is rectangular, in order that the finished grate structure can be easily lifted from the open-faced mold. Such cross-sectional configurations do not provide for the most efficient structural use of the resin material. Further, because reinforcing fibers are laid into the vertically disposed grooves of the open-face mold manual pressing of the fibers may result in an uneven distribution of fibers across the cross-section of resulting grate structure.

Thus, a more economical and efficient process for producing fiber reinforced plastic grate structures on a continuous basis, rather than on a batch basis as described above, is desirable. Furthermore, an improved fiber reinforced plastic grate article providing greater structural strength and rigidity, while reducing usage of expensive plastic resin materials, would be advantageous.

SUMMARY OF THE INVENTION

According to the present invention a process and apparatus are provided for the continuous production of fiber reinforced grating articles. The inefficiencies and disadvantages of prior art processes for production of fiber reinforced plastic grate structures are overcome by providing a unique apparatus which facilitates the production of continuous lengths of grating articles. The apparatus comprises a mold, defined by a molding cavity formed between two endless mold tracks, each track containing one-half of the mold. Reinforcing fibers, impregnated with an appropriate amount of plastic resin material, are woven about each of the mold protrusions on each of the endless tracks and the grate structure is formed when heating elements, positioned adjacent that portion of the apparatus where the two endless tracks mesh to form a molding cavity, cause the plastic resin to set. The weaving patterns by which the impregnated fibers are woven into the continuously moving mold tracks provide for maximum effective strength of the resulting fiber reinforced plastic grate articles. Further, the cross-section of the span bars of the grating articles is generally "Z" shaped, providing for better structural properties, per cross-sectional area, than the simple rectangular cross-sections of the span bars of prior art fiber reinforced plastic grating articles.

Basically, the process of the subject invention includes;

impregnating continuous strands of reinforcing fibers with a thermosetting plastic resin;

introducing the strands into upper and lower endless molding tracks;

rotating the upper and lower endless molding tracks so as to form a closed mold cavity defining the shape of the grate structure;

heating the mold cavity to set the thermoplastic resin and thereby form a fiber reinforced plastic grate article.

The apparatus of the present invention which provides for the continuous production of fiber reinforced plastic grate articles is generally composed of the following elements:

means for coating reinforcing fibers with a thermosetting plastic resin;

a winder assembly for feeding and weaving fibers into a molding assembly;

a continuous molding assembly comprising upper and lower endless mold tracks each of said tracks having molding teeth mounted thereon which mesh to form a mold cavity defining the shape of the grate structure being produced; and heating elements, adjacent that portion of the molding assembly where the molding teeth mesh to form the molding cavity, for heating said cavity to thereby set the plastic resin.

Fiber reinforced plastic grate structures produced by the process and apparatus briefly described above have improved structural properties as compared to similar structures which have been previously available. The improved structural characteristics are due, in part, to the unique cross-sectional configuration of the span bars (that is the longitudinal load bearing bars) of the grate structures produced in accordance with the present invention. In contrast to the normally rectangular cross-sectional configuration employed in the past, the span bars of the fiber reinforced plastic grate structures of the present invention have a generally "Z" shaped cross-sectional configuration. This cross-sectional shape provides for greater rigidity and bending strength of the span bars. In addition to the "Z" cross-sectional configuration of the span bars of the grate structures of the present invention, the process and apparatus of the present invention provide a unique system for automatically weaving the reinforcing fibers in a pattern so as to obtain maximum structural advantage from the presence of the fibers within the plastic resin material. According to one preferred weaving pattern, more fully described below, the reinforcing fibers present within the plastic resin of the grate structures of the present invention are woven so that at least five strands lie longitudinally along each of the span bars with at least four strands at each of the intersections between span bars and transverse tie bars. These continuous fibers provide maximum structural strength to the grating articles because of their continuous lengths and the uniform presence of a multiple of strands interconnecting span bars with tie bars and other span bars.

BRIEF DESCRIPTION OF THE DRAWINGS

The process and apparatus of the present invention, as well as the novel grate structures thereof, can be better understood from a study of the drawings in which:

FIG. 2 is a partial front view of the winder assembly of the present invention;

FIG. 3 is a side view of the winder assembly of the present invention partially cut away to show a side view of the upper continuous mold track;

FIG. 5 is a side view of a portion of a continuous molding track comprising a chain link belt with molding plates and molding teeth mounted thereon;

FIG. 6 is an end view of one molding tooth of the continuous molding track of the present invention;

DETAILED DESCRIPTION OF THE INVENTION

The fiber reinforced plastic grating articles of the present invention can be fabricated from conventional materials heretofore employed in various types of fiber reinforced plastic articles. The fibers which are used within the scope of this invention can comprise a variety of high tensile strength reinforcing fibers known in the art which are flexible enough to be woven into the mold, as further described below. Examples include glass fibers, steel, nylon, tungston, boron and the like. The type of fibers and number of fibers utilized can be varied to yield a product having the desired strength or density. Some preferred types of fibers are glass fibers sold by Owens Corning Company under the designation Type 30, and glass fibers sold by Pittsburgh Plate Glass under the designation 1064-247. The thermosetting plastic resins employed with the fibers can be any of a number of suitable mixtures such as, for example, a mixture of 40% polyester resin, 10 weight percent styrene monomer, 10 weight percent of a solvent such as acetone, 38 weight percent of filler materials such as silicate fillers, and 2 weight percent of a benzoil peroxide catalyst paste. If desired, the above mixture can contain small concentrations of other additives, such as pigments, wetting agents, release agents, ultraviolet absorbers, promoters, chemical thickeners such as magnesium oxide, and inhibitors.

Figure 1:
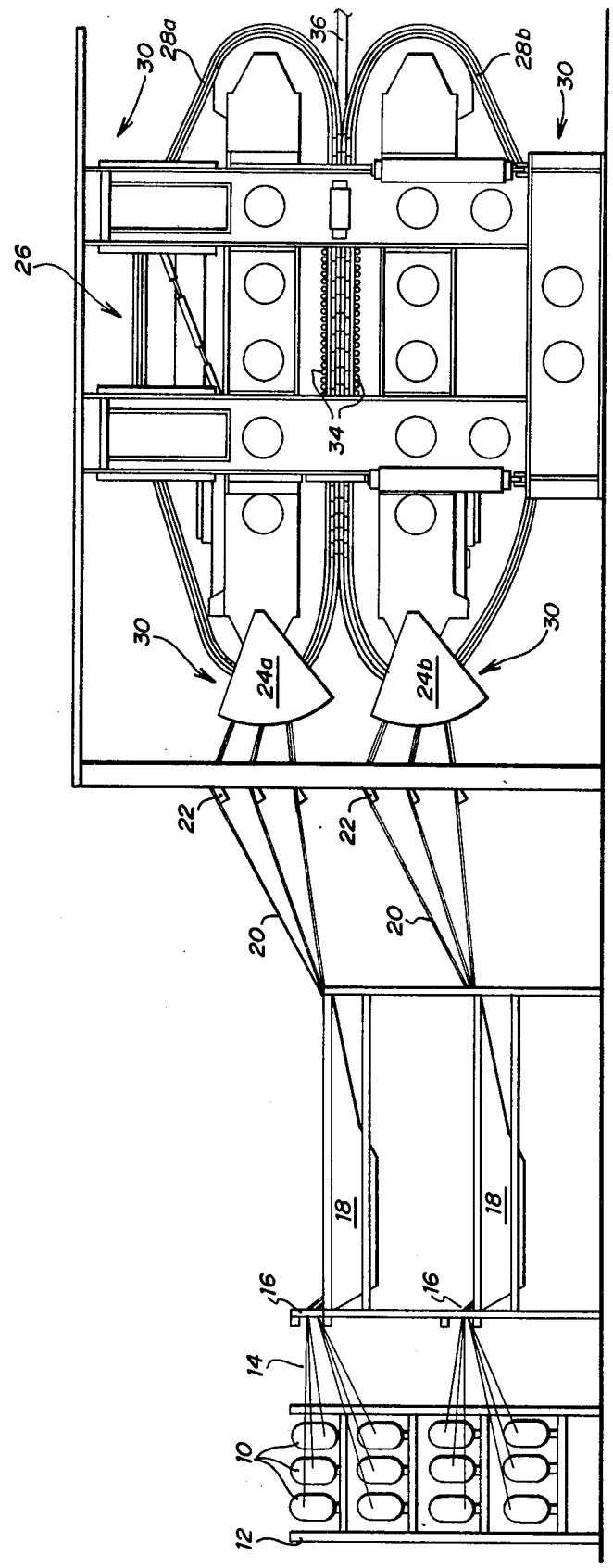
FIG. 1 is a side view of the apparatus of the present invention.

The first step of the process of the subject invention comprises impregnating or coating the fiber reinforcing strands with a suitable amount of a thermosetting plastic resin, such as those described above. Referring to FIG. 1 this portion of the operation will now be described. Continuous lengths of the fibers are normally available on spools 10 which can be conveniently stored on a rack means 12. An extended rack means containing a large number of spools of fiber can be employed to insure that a sufficient amount of fibers will be available so that the continuous operation of the apparatus will not be interrupted except at extended intervals. Uncoated fibers 14 are threaded off spools 10 and through guide means 16 for both the upper and lower portions of the winder assembly (to be further described below). Resin pans 18 contain plastic resin, such as those described above, and can be continuously fed by a pumping means from storage barrels of the resin. Uncoated fibers 14 move through guide means 16 and into resin pan 18 where a series of rollers or the like (not shown) serve to guide the fibers through the plastic resin thereby resulting in coated fibers 20 exiting from resin pan 18 and entering winder guide means 22. In this manner a series of continuous lengths of plastic resin coated reinforcing fibers are delivered to the upper and lower portions of the winding apparatus described hereinbelow.

The resin coated fibers 20 are fed through the probes of winder assemblies 24a and 24b (upper and lower respectively). The winder assemblies weave the coated fibers 20 into the molding teeth of molding apparatus 26. Molding apparatus 26 comprises upper and lower continuous molding tracks 28a and 28b. Each of the molding tracks 28 comprise a series of transverse molding teeth plates upon which are mounted molding teeth which mesh to form the mold cavity within which the grating articles of the present invention are formed. Molding tracks 28a and 28b can be chain driven in the direction indicated by arrows 30. The center portion of molding apparatus 26 where the molding teeth of continuous molding tracks 28 mesh to form a molding cavity is heated, for example by transverse electrical heating elements 34 extending across the width of continuous molding tracks 28, and adjacent thereto. The continuous grating article 36, formed in the mold cavity, exits from between continuous molding tracks 28a and 28b at the rear of molding apparatus 26. These continuous lengths of fiber reinforced grating can be conveniently cut into desired lengths by conventional types of cutting apparatus (not shown).

Referring to FIGS. 2 and 3 a detailed description will now be presented with respect to winding assemblies 24a and 24b which weave the plastic resin coated fibers 20 onto the molding teeth of continuous molding tracks 28a and 28b (as shown in FIG. 1). Each of the winding assemblies 24 basically comprise slide rods 38 mounted horizontally across the front face of continuous molding tracks 28, each of the slide rods having mounted thereon a plurality of probe members 52 which comprise hollow finger-like cylinders through which the resin coated fibers 20 are passed. The slide rods 38 are mounted, at one end thereof, to a cylinder plate 48 which in turn is connected with a hydraulic cylinder means 46 providing for a shifting of the cylinder plate 48 and slide rods 38 in a horizontal direction across the face of continuous molding track 28.

More specifically, with reference to FIGS. 2 and 3, slide rods 38 are shown slidably mounted through apertures in mainplate 40, in parallel pairs (such as slide rods 38a and 38b). The slide rods 38 terminate and are fixed to slide rod plate 42 which is affixed to piston rod 44 which in turn extends into winder cylinder means 46 mounted on cylinder plate 48. Thus, delivery of hydraulic fluid to winder cylinder means 46 causes slide rod plate 42 to move horizontally backward or forward thereby causing like displacement of slide rods 38. Mounted on slide rods 38a and 38b, probe blocks 50, provide a mounting means for probe members 52 and are slidably mounted on slide rods 38. Probe blocks 50 may be adjusted horizontally along the length of the slide rods 38 and fixed in a desired position thereon by set screws or the like. Probe blocks 50 and probe members 52 cooperate to form a generally cylindrical chamber through which the resin coated fibers 20 to be molded can be threaded. By providing a removable probe member 52, threading of the resin impregnated fibers can be more easily accomplished by simply laying them across the top surface of probe block 50 and then sliding into place probe member 52.

As can be seen from a study of FIG. 3, which is a side view of the winder assembly of the present invention, probe member 52, when mounted on probe block 50 (which in turn is mounted on slide rods 38), extends into the angular crevice between molding teeth 54 mounted on molding plates 56 which are affixed to chain means 58 to form continuous molding track 28, further described hereinbelow. Thus, the resin coated fibers 20 extending through probe member 52 can be woven into continuous mold track 28 in a longitudinal manner through the rotation of said mold track to thereby form longitudinal span bars of the grating articles of the present invention. Likewise, the resin coated fibers 20 can be woven transversely via the horizontal transverse action of the winder assembly slide rods 38 to thereby form transverse members of the grating articles of the present invention. Thus, to form a length of a span member of the grating article, continuous molding track 28 is rotated for the necessary distance to form the desired length, and to form a transverse member the rotation is stopped, and the winding cylinder 46 activated to cause slide rods 38 to move in a transverse horizontal direction thereby causing probe members 52 to lay coated fibers 20 in a transverse direction for a predetermined length. In some cases it may be desirable to allow one set of slide rods 38 to remain stationary such that continuous longitudinal coated fibers 20 form only the longitudinal span base, no transverse, horizontal motion being imparted to the slide rods 38 to weave the coated fibers 20 into those portions of the continuous molding track 28 which form transverse tie bars. The transverse tie bars can be formed by a second set of slide rods 38 moving in the manner described above.

In a preferred embodiment of the present invention three pairs of slide rods 38 are employed in each of the upper and lower winder assemblies 24. Further, in a preferred embodiment of the present invention winder cylinder means 46 is adapted such that the horizontal transverse movement of slide rods 38 across the face of mold tracks 28 (and, therefore, the movement of each of the probe members 52 affixed thereto) is equal to the width of two molding teeth. When this arrangement is employed, the probe members 52 mounted on the end the slide rod closest to the edge of of the track 28 in which direction the slide rod is indexed (e.g. left end of a slide rod which is indexed two positions to the left, and then back) can be spring biased so as to only index a single position. In this manner the coated fibers 20 woven by such end probe members are kept within the confines of the molding track. This particular embodiment of the invention is especially useful in some of the novel weaving patterns described further hereinbelow.

Figure 4:
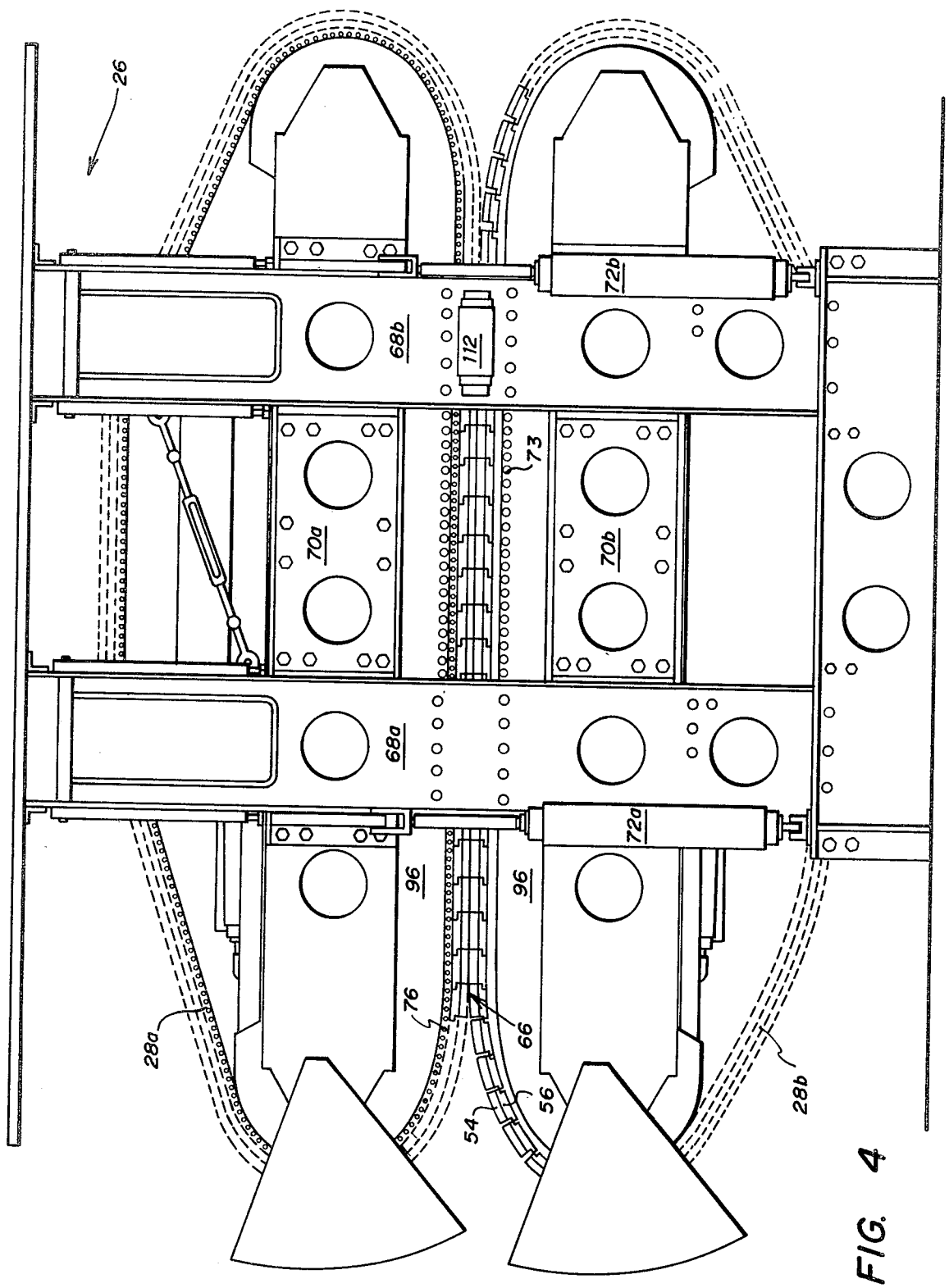
FIG. 4 is a side view of the molding apparatus of the present invention.

Referring to FIG. 4, molding apparatus 26 basically comprises a molding frame, continuous molding tracks 28a and 28b, a drive means, heating elements 73 and a stripper assembly (described below). The basic operation of molding apparatus 26 is as follows. Continuous molding tracks 28a and 28b operate in a conveyor belt like manner, each of the continuous tracks rotating in a direction opposite to the other. Thus, for example as depicted in FIG. 4, upper continuous molding track 28a rotates in a counterclockwise direction while lower continuous molding track 28b rotates in a clockwise direction. Molding teeth 54 (which are present along the entire length of molding tracks 28 but are only partially shown in FIG. 4) mounted on each of the upper and lower continuous molding tracks 28a and 28b mesh, at mesh point 66, to form a molding cavity within which the grating articles of the present invention are formed. Thus, coated fibers 20 supplied on a continuous basis to upper continuous molding track 28a, and lower continuous molding track 28b, by winder assemblies 24a and 24b, respectively, are carried into the molding cavity created between continuous molding tracks 28a and 28b thereby forming a continuous length of the fiber reinforced plastic grating article 36 (as shown in FIG. 1) which exits from the rear end of molding apparatus 26 in continuous lengths.

The molding frame means generally comprises vertical support means 68a and 68b as well as horizontal support means 70a and 70b around which upper continuous molding track 28a and lower continuous molding track 28b rotate, respectively. Further, molding track lift cylinders 72a and 72b are provided so that horizontal support means 70a and 70b may be easily separated to facilitate cleaning of the continuous molding tracks 28 and/or adjustment of the molding teeth 54 thereof.

Referring to FIG. 5, continuous molding tracks 28 are comprised of molding track segments mounted on continuous chain link belts 76. Molding teeth 54 can be individually mounted on molding plates 56, or molding plate 56 can be manufactured so as to comprise a unitary structure including molding teeth 54. Thus, molding track 28 can be assembled by securing a series of molding plates 56 onto a chain link belt 76 by means of bolt screws or the like. The molding plate 56 as shown in FIG. 5, comprises a lip portion 78 protruding over one edge of molding plate 56 and a foot portion 80 protruding from the lower portion of the opposite side of the molding plate 56. Thus, as shown in FIG. 5, the lip portion 78 of the molding plate 56 meshes with the foot portion 80 of the molding plate adjacent and in front of it so that when the two molding plates 56 lie in substantially the same plane (as during passage through the molding cavity portion of the molding apparatus 26) a flush seal is achieved between the two molding plates thus protecting against leakage of any excessive amounts of plastic resin which may be present. Molding plate 56 also comprises pawl slot 82 and generally will comprise a plurality of such slots which provide a place for the pawl of the ratchet type drive mechanism (described below) to grab and move the continuous molding track 28 forward. In the preferred embodiment of the molding plate 56 depicted in FIG. 5, threaded mounting holes 84 are provided for bolting the plates into position on chain link belts 76 and alignment holes 86 are provided for bolting molding teeth 54 to the molding plate 56.

Molding teeth 54, which can be molded protrusions of molding plates 56, generally are of rectangular shape when viewed from the top or bottom and have what can best be described as a chair-like cross-section. Thus, referring to FIG. 6 one embodiment of the cross-section of a molding tooth 54 comprises a back surface 88 a slanted seat surface 90 and a leg surface 92. Thus, when two molding teeth, one on an upper molding plate 56 and the other on a lower molding plate 56 are meshed together to form a molding cavity, seat surfaces 90 of each of the molding teeth seal together while the back surfaces 88 form molding cavity 94 in which the fiber reinforced plastic grate structures of the present invention are formed. Thus in FIG. 7, the molding cavity 94 defines the cross-section of span bars of the grate structures of the present invention. The transverse members of the grate structure are formed in a relatively rectangularly shaped mold cavity defined by the space between two rows of molding teeth 54 seated in position on two consecutive molding plates 56. Thus, in this embodiment of the invention the resulting grating article has longitudinal span bars having a cross-sectional configuration which can best be described as a "Z" pattern and transverse members having a generally rectangular cross-section.

Figure 7:
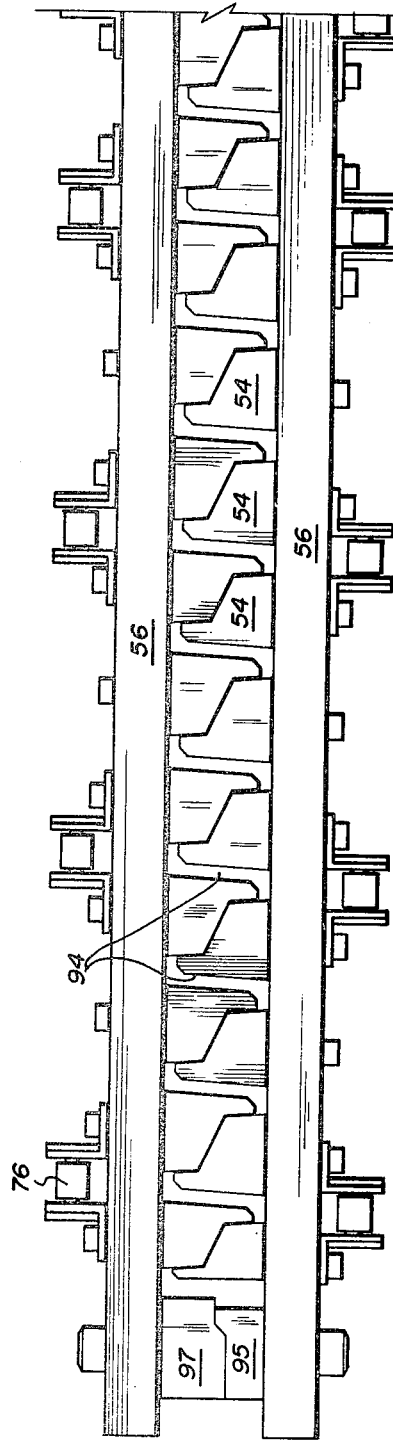
FIG. 7 is a front sectional view showing the upper and lower continuous molding tracks in a meshed position to form the molding cavities.
Figure 8:
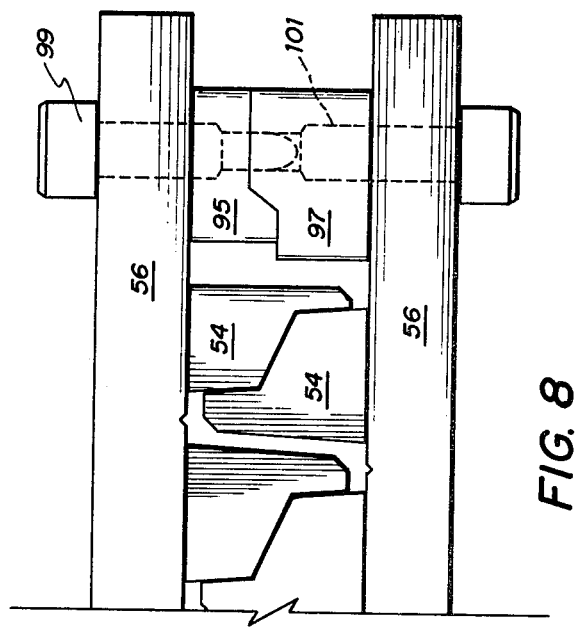
FIG. 8 is an enlarged view of the end portion of the meshed molding tracks.

The teeth which form the outermost longitudinal span bars are of a slightly modified configuration, as shown in detail in FIG. 8, and at the left hand portion of FIG. 7. These end blocks are either short end blocks 95 or tall end blocks 97. While the configuration of such end blocks may vary, the purpose thereof is both to provide an end span which has a slightly larger cross-sectional area (and therefore has greater structural strength) and to provide means for insuring alignment of the molding teeth 54 contained along the molding track plate 56. Thus, alignment bolts 99 and alignment sockets 101 insure that as each molding track plate 56 meshes with the plate above or below it at the mesh point 66 to form the molding cavity, proper engagement of upper molding teeth 54 with lower molding teeth 54, will occur.

Figure 9:
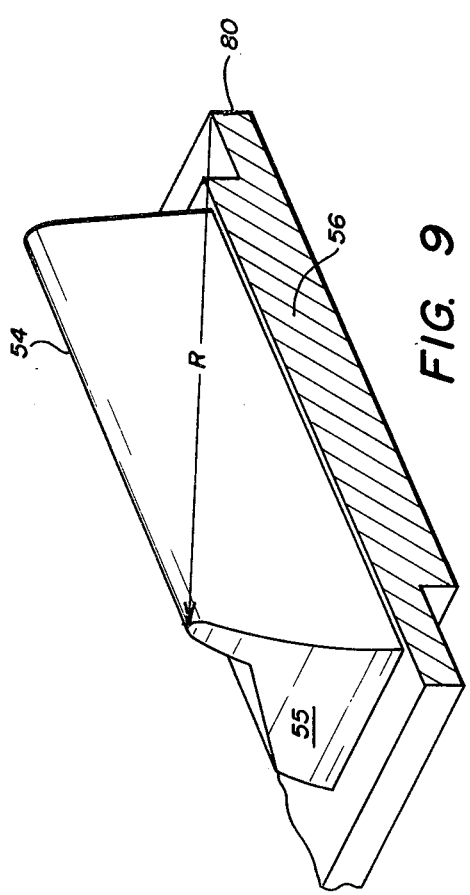
FIG. 9 is a perspective view of a preferred molding tooth shape.

Referring to FIG. 9 a preferred shape for molding teeth is depicted. Basically, the tooth, shown in FIG. 9 in perspective, is substantially similar to that described above, the major difference being a curved leading edge surface 55. This curved surface is convex and may, for example, be formed by machining the leading edge surface 55 such that it is curved and has a radius (R) of about $3\frac{7}{8}''$ when the molding teeth are about 2.8" in length and about 1.4" in height, said radius measured from the upper edge of the foot portion 80 of molding plate 56 (as shown by the arrow in FIG. 9). This configuration is especially useful during the stripping of the grating articles from the continuous molding tracks 28.

The chain link belts 76 upon which are mounted the molding plates 56 to form the continuous molding tracks 28 are seated on mold track rails 96 (see FIG. 4) which are supported by the horizontal support members 70a and 70b of the molding apparatus 26 as described above. Thus, the continuous molding tracks 28 rotate in an elongated oval path riding on mold track rails 96 via chain link belts 76. A plurality of mold track rails 96 can be provided, in parallel, such that a plurality of chain link belts 76 can be employed to drive the continuous molding tracks 28.

In order to thermally set the resin coated strands of reinforcing fibers, heating elements 73 in the form of heating rods (as shown in FIG. 4) are provided adjacent that portion of the molding apparatus which forms the molding cavity 94. Heating elements 73 are positioned transversely across the interior of each of continuous molding tracks 28a and 28b, inserted through apertures in mold track rails 96 (described above) so as to be close to the molding plates 56 as they rotate. While any number of heating elements 73, in various configurations can be employed the heating elements should be able to maintain temperatures of from about 100° F. to about 350° F. within the molding cavity 94.

Figure 10:
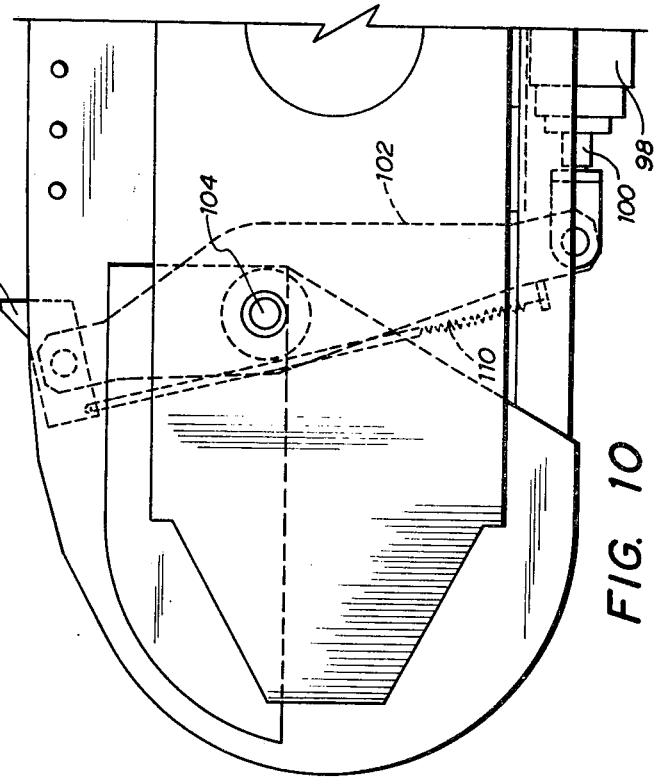
FIG. 10 is a side view of the drive means for the upper continuous molding track.

While any conventional drive means may be used to rotate continuous molding tracks 28 along mold track rails 96, it has been found that an especially effective means for driving the continuous mold tracks 28 is a drive assembly comprising a drive cylinder means, a rocker arm means and a pawl means. Thus, as shown in FIG. 10, drive cylinder 98 can be affixed along the bottom portion of a horizontal support means 70a or 70b with cylinder rod 100 being located so as to provide for horizontal longitudinal motion, back and forth. Cylinder rod 100 is affixed to one end of rocker arm 102 which is pivoted at a pivot point which can be provided, for example, by providing rocker arm axle 104 passing transversely through a horizontal support means 70. At the upper end of rocker arm 102 a pawl means 108 is pivotably attached. Spring means 110 can be employed to effect a ratchet type movement of pawl means 108. Thus, in this preferred embodiment for driving continuous molding tracks 28 about mold track rails 96, drive cylinder 98, when activated in a positive direction, will cause rocker arm 102 to rotate in a clockwise direction around axle 104, thereby causing pawl means 108 to catch in the pawl slots 82 of the molding plates 56 described hereinabove. Once cylinder rod 100 of drive cylinder 98 reaches its furthest extension, pawl means 108 will have rotated continuous molding track 28 for a predetermined distance. Upon reversing hydraulic fluid in drive cylinder 98 rocker arm 102 will rotate in a counterclockwise direction causing pawl means 108 to slip out of pawl slot 82 in mold plates 56. A series of drive cylinders, rocker arms and pawl means can be employed to move the continuous molding track 28 in the desired direction. Similar means can be mounted so as to provide for reverse movement of the continuous molding track means. This method for driving the continuous track of the molding apparatus of the present invention provides for precise sequential movement of the continuous molding tracks 28 for a predetermined distance. This type of sequential, or step-wise rotation, is especially useful when employing complex weave patterns of continuous fiber reinforcing materials such as those further disclosed hereinbelow.

Figure 13:
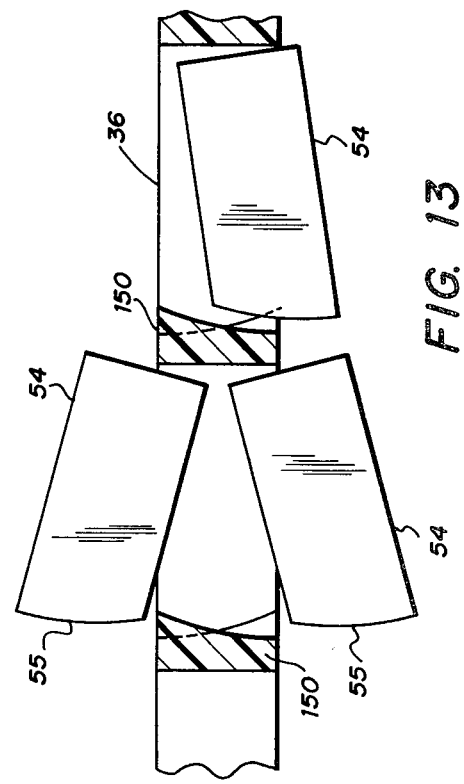
FIG. 13 is a side view of two molding teeth separating from a formed grating article; demonstrating the stripping action of the molding teeth depicted in FIG. 9.
Figure 11:
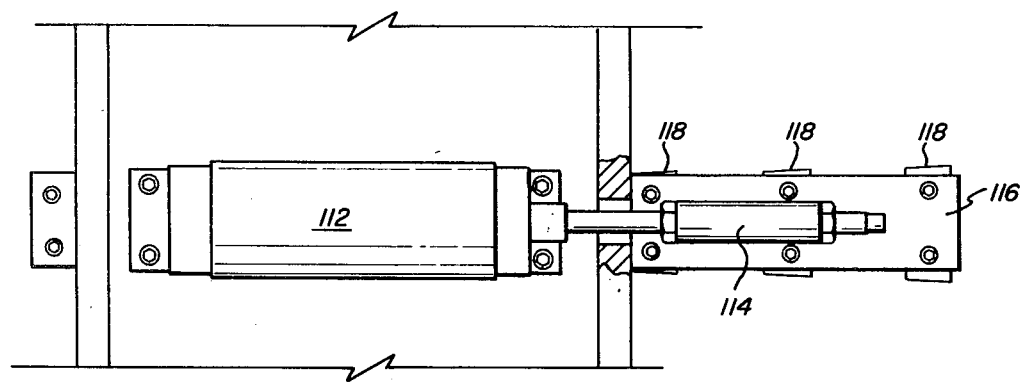
FIG. 11 is a side view of the stripper mechanism of the present invention.
Figure 12:
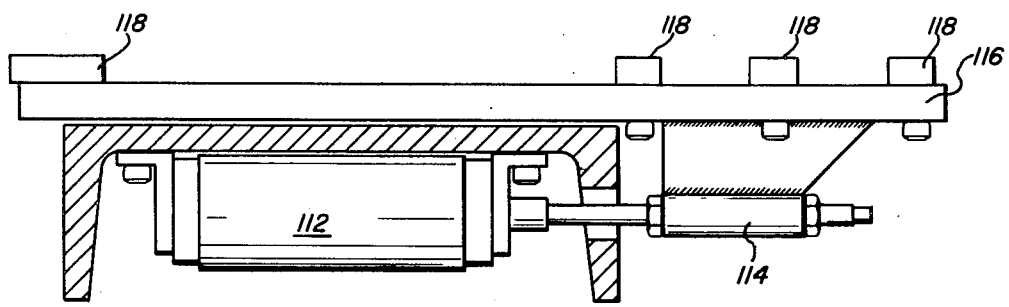
FIG. 12 is a top view of the stripper mechanism of FIG. 11.

The molding apparatus 26 of the present invention also comprises a stripping means (as shown in FIGS. 11 and 12) for aiding the removal of the continuous grating article formed by the continuous molding tracks 28a and 28b, by guiding and stripping the freshly molded portions of the grating article from the continuous molding tracks 28a and 28b, as they separate. Stripping means which have been found to be useful for this purpose include stripper cylinders 112, which can be mounted horizontally on vertical support members 68 on either side of the machine at the point at which continuous molding tracks 28a and 28b separate (see FIG. 4). Stripper cylinder rod 114 can be affixed to a cleat plate 116 which has a plurality of cleats 118 mounted thereon. These cleats 118 are positioned such that they contact the edges of the fiber reinforced plastic grate structure as it exits the outlet end of the molding apparatus 26. Stripper cylinder 112 can be activated to provide horizontal outward motion via stripper cylinder rod 114 and cleat plate 116 to the cleats 118 which frictionally engage with the newly formed portion of the fiber reinforced plastic grate structure and guide and assist it out of the mold cavity, which, at this point in the process, is separating into its two halves (continuous mold tracks 28a and 28b). It has further been discovered that by employing the preferred shaped molding teeth 54, described above with relation to FIG. 9, the stripping of the fiber reinforced plastic grate structure from the continuous mold tracks 28a and 28b is greatly improved. Thus, referring to FIG. 13 a schematic representation of this stripping action is depicted. Molding teeth 54, having curved leading edge surface 55 swing more easily away from the transverse tie bar portion 150 of the fiber reinforced plastic grating articles 36 to provide a rotational stripping action. Of course the finished grating article 36 will have intersecting concave surfaces on the side of the transverse tie bar portions 150 formed by the curved leading edge surfaces 55, but this does not reduce strength significantly and the aforementioned stripping action alleviates damage which might otherwise occur to the grating articles 36 as the continuous molding tracks 28 separate.

The apparatus described above, basically comprising the resin pan, winder guide means, winder assembly and molding apparatus, when supplied with suitable thermosetting plastic resin and continuous strands of reinforcing fibers, can be employed to form fiber reinforced plastic grate structures on a continuous basis in a number of manners. Further, one skilled in the art will appreciate that other open channel structures can be produced using the above-described apparatus.

Basically, as described hereinabove, the uncoated fibers are fed through resin pans 18, coated therein with resin, and fed through winder guide means 22 and into the winder assembly comprising upper winder assembly 24a and lower winder assembly 24b. The coated fibers 20 are then fed through the probe members 52 of the winder assemblies and are laid in the gaps between molding teeth 54 which close (upon rotation of the continuous mold tracks 28) to form a molding cavity. The angle of closure, that is, the angle at which the molding teeth plates 56 of the upper and lower continuous molding tracks 28 mesh is important since it is related to the pressure created in the molding cavity itself. Generally an angle of closure between from about 1 to about 10 degrees can be employed with a preferred angle of closure being about 2 degrees. The dwell time of any given portion of the grate structure being fabricated, that is, the time which elapses between the moment the upper and lower molding teeth plates are closed to form the molding cavity and the moment they open to allow the formed portion of grating article 36 to exit, is dependent upon the materials being employed. Generally dwell times in the area of five minutes have been found to be useful. Of course, the angle of closure, temperature within the molding cavity and dwell time can be adjusted as desired depending upon the particular reinforcing fibers and resins being employed. Dwell times of at least about 2 minutes are preferred.

Winder assembly means 24a and 24b provide for a variety of weaving patterns wherein the coated fibers 20 are laced transversely to form the transverse tie bars of the grate structures of the present invention. In addition, if the winder assembly is allowed to remain inactive, the coated fibers will be drawn into the longitudinal molding cavities of the molding apparatus by the movement of continuous molding tracks 28a and 28b without transverse winding. Such procedure results in fiber reinforced bar structures, without connecting transverse members.

Figure 14:
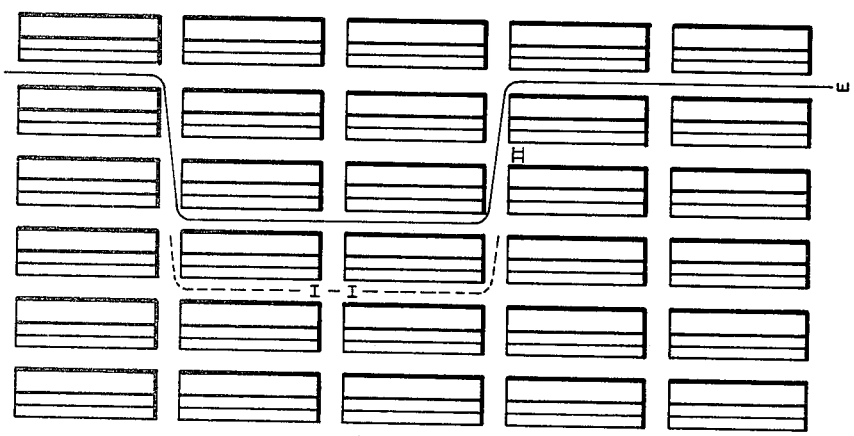
FIG. 14 is a schematic representation of a plan view of a portion of one continuous molding track showing a single fiber laced thereon.

For convenience, the longitudinal portions of the molding cavity which form the longitudinal span bars of the grate structures of the present invention will be referred to as longitudinal columns which are formed along the length of the molding teeth 54. The portion of the molding cavity which forms the transverse tie bars and is defined by the end faces of the molding teeth will be referred to as transverse rows. Thus, as shown in FIG. 14, a plan view of a section of continuous molding track 28 having molding teeth mounted thereon, will comprise intersecting columns and rows wherein the coated fibers 20 are woven prior to the closing of the two continuous molding tracks 28 to form a molding cavity which is heated to set the thermoplastic resin coating of the fibers.

In a preferred embodiment it has been discovered that by employing the transverse motion of the winding mechanism of the present invention in conjunction with the longitudinal motion of the continuous molding tracks, fiber reinforced plastic grate structures can be manufactured which have greater strength while employing substantially less amounts of relatively expensive plastic resin materials than have heretofore been employed. The results are effected by providing for continuous strands of reinforcing fibers and insuring that each longitudinal span bar and transverse bar of the grate structure comprise at least a specified minimum number of the reinforcing fibers. Further, by weaving continuous strands of fiber in such a manner that certain portions of the fiber form longitudinal span bars while other portions of the same continuous fiber form transverse tie bars, structural integrity of the grate structure is enhanced and important joint strength, at the intersections of transverse tie bars and longitudinal span bars, is greatly improved.

Although a variety of weaving patterns can be employed using the apparatus described above, several preferred embodiments of the weaving operations will be set forth herein as exemplary. Thus, referring to the path of a single strand of continuous fiber, one weaving pattern which can be employed comprises laying a continuous fiber in a portion of a first column along the length of two molding teeth, indexing the fiber (either to the right or to the left) along a first row, for the width of two of the molding teeth, and laying the fiber along a portion of a second column (which is longitudinally disposed from the aforementioned portion of the first column) along the length of two molding teeth, and then indexing the fiber back along a second row for the width of two teeth to thereby return to the first column.

While this weaving pattern is fairly complex in description it may be effected easily and rapidly using the above-described apparatus. Thus, the above-described weaving pattern can be effected by feeding the end of a continuous fiber into a starting position in a column (formed between two of the molding teeth) at the intersection of a column and a row as described above and practicing the following procedure:

activating the drive system forward to rotate continuous molding tracks 28a and 28b forward for the distance of the length of two molding teeth;

activating the winding mechanism to cause a probe member 52 mounted on slide rods 38 to index for the width of two molding teeth;

activating the drive means a second time to rotate continuous molding belts 28a and 28b forward for the length of two more molding teeth; and activating the winder assembly in reverse to index the probe 52 back along a second row for the width of two molding teeth to thereby return the fiber to the first column.

Now referring to FIG. 14, which depicts a plan view of a portion of a continuous molding track 28 of the subject invention, the above-described weaving pattern is demonstrated by the path of a single continuous reinforcing fiber E. Thus, the longitudinal portion of fiber E (designated I—I) forms a portion of the longitudinal span bars of the grate structure, the resin coating of the fiber flowing into the "Z" shaped molding cavity and being set by the application of heat. That portion of fiber E which is designated II forms a portion of the transverse tie bars in a similar manner.

Of course, depending upon the size of the grate structure and the diameter of the reinforcing fibers being employed, more than one such coated fiber may be laid along the same path between the molding teeth. Thus, multiple fibers are provided for by supplying a multiple of slide rods 38 having a multiple of probes 52 mounted thereon in a vertically aligned manner. Thus, for example, each winder assembly 24 described above can have a set of two slide rods 38 with probe members 52 mounted thereon such that two continuous strands of reinforcing fibers are laid down, one on top of the other, along the path of fiber E depicted in FIG. 14.

Figure 15:
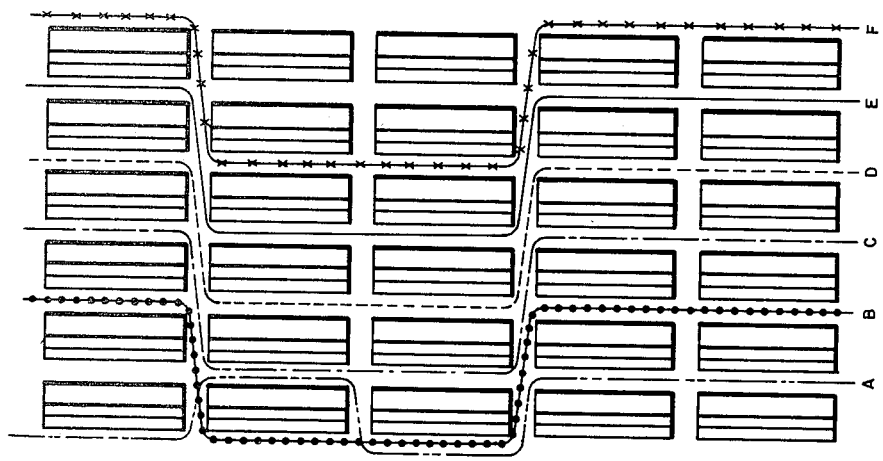
FIG. 15 is a plan view of a portion of one continuous molding track showing a plurality of fibers laced thereon.

FIG. 15 schematically depicts a plan view of a portion of one continuous molding track 28 having a series of reinforcing fibers (A through F) wound into the columns and rows formed between the molding teeth. Thus, each of the fibers can be woven along the path indicated by the transverse motion of the winder assembly 24, and the longitudinal rotation of the continuous molding tracks 28 in the manner described above. As can be seen from a study of FIG. 15, the winding pattern depicted is particularly advantageous in that it provides for continuous reinforcing fibers being present in both transverse tie bars and longitudinal span bars. In this manner, the tie bars and span bars are structurally tied together. Furthermore, this particular weaving pattern provides for multiple strands present at the intersections of span bars and tie bars. This arrangement adds strength to the grate structure at these natural stress points. Of course, as described above, a multiple of fibers can be woven, one on top of the other, into the pattern shown by fibers A–F in FIG. 15.

As noted above with respect to the structure of the winder assembly 24, the last probe member 52 is spring biased in a manner such that when the rest of the probes index for the width of two teeth, the probe at the end of the slide rod will be indexed only position. In this manner fiber A is wound into the continuous mold track in a pattern in which the fiber is indexed transversely for the width of only one molding tooth. This provides for an even end span bar and alleviates the necessity of cutting off excess fiber which would occur if fiber A were indexed two positions, thus leaving a portion of the fiber outside of the outer edge of the molding track 28.

Figure 16:
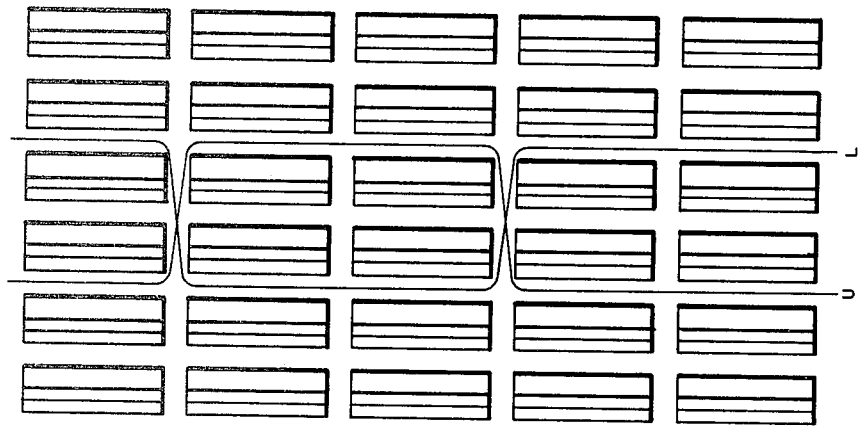
FIG. 16 is a plan view of a portion of one continuous molding track showing two fibers, one laced by the upper winder assembly and one laced by the lower winder assembly.

Now referring to FIG. 16 a partial schematic representation of the winding pattern of the continuous fibers is shown, the fiber U having been laced by the upper winder assembly and that labelled L having been laced by the lower winder assembly. Thus, as can be seen from a study of FIG. 16, by indexing the lower winder assembly 24b to the right and back, and the upper winder assembly 24a to the left and back the resulting grate structures have highly interwound continuous fibers tying together both the longitudinal span bars and the transverse tie bars of the grate structure.

Thus, according to one preferred weaving pattern, continuous strands of reinforcing fibers will be vertically staked and wound into the upper and lower continuous molding tracks in the manner depicted in FIG. 15, the upper and lower strands becoming further crisscrossed as shown in FIG. 16.

Figure 17:
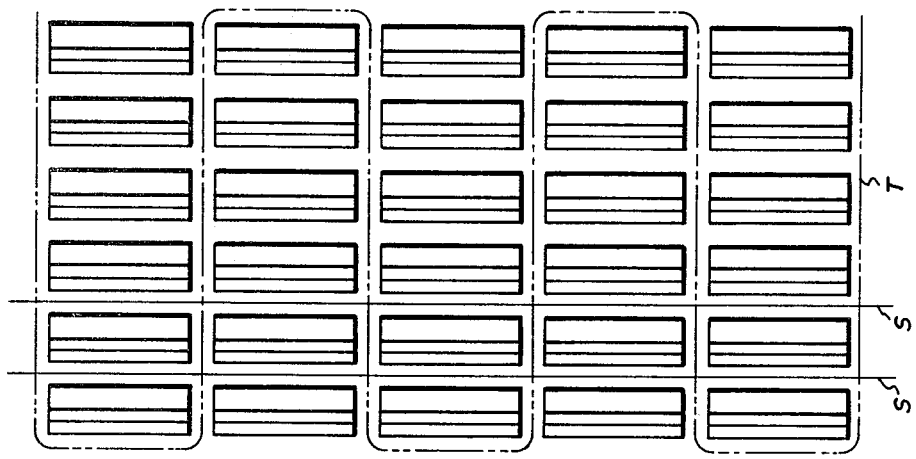
FIG. 17 is a plan view of a portion of one continuous molding track showing longitudinally laced fibers and transversely wound fibers.

FIG. 17 illustrates a more simple, yet effective winding pattern which can be accomplished using the method and apparatus of the present invention. Thus, fibers S are laid into the columns of the molding track without being wound transversely. This is accomplished by not indexing the slide rods (having probe members 52 mounted thereon) which guide fibers S into the molding tracks. Fibers T are wound either completely across the transverse width of the molding tracks, (as shown) or for a portion of such width and are thereby laid into the rows which form the transverse tie bars of the grate structure. The next transverse tie bar is formed by indexing the fiber T along the end column (or an intermediate one) from which it can then be indexed back along a row in a transverse direction. Many variations of this pattern will be apparent to those skilled in the art, the distinguishing features being that some fibers S are not wound transversely and form continuous lengths of longitudinal span bars, while other fibers T are wound back and forth to interconnect the longitudinal span bars to thereby form transverse tie bars.

Figure 18:
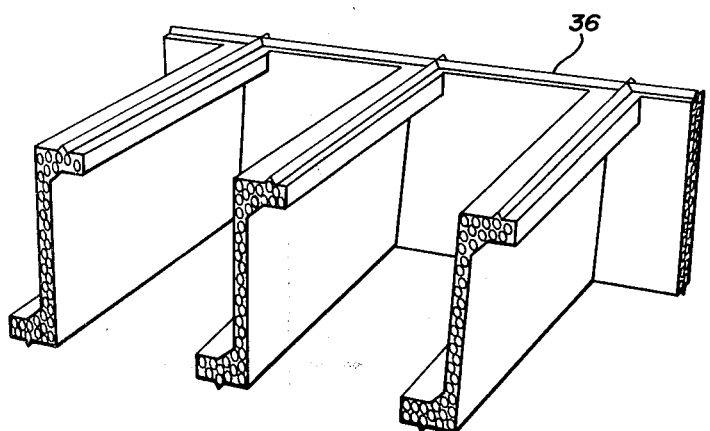
FIG. 18 is a perspective view of a portion of a grate structure of the present invention.

Now referring to FIG. 18, a cross section of the grate structure of the present invention is shown. The unique configuration of the molding teeth employed in the preferred embodiment of the present invention provides for a substantially "Z" cross sectional configuration of longitudinal span bars. This "Z" configuration provides increased strength in the span bars while allowing a minimum amount of resin and reinforcing fiber materials to be employed. The structural strength gained from such cross sectional configurations of the span bars is such that resin usage can be reduced by three-fourths when compared to fiber reinforced plastic grate structures of equal strength having a substantially rectangular cross sectional span bar configuration.

Of course, the transverse tie bars formed by the rows in between the ends of the molding teeth of the preferred embodiment of the present invention will be of substantially rectangular cross section when the flat leading edge teeth are employed and will have intersecting convex surfaces (as described hereinabove) when the preferred teeth, having curved leading edge surfaces 55 are employed. However, as noted, the span bars provide the majority of structural strength of the grate structure and carry most of the structural load. Further, because the continuous fibers are wound in a manner such that the span bars are tied together by continuous strands of fiber, structural strength of the grate structures is further enhanced.

While this invention has been described with respect to the preferred embodiments thereof, various modifications and adaptations will be apparent to one of ordinary skill in the art. Therefore, the above description of the preferred embodiments is not to be understood in a limited sense and this invention is circumscribed only by the scope of the appended claims.

I claim:

1. A process for producing fiber reinforced plastic grate structures having longitudinal span bars and transverse tie bars comprising:
    (a) feeding continuous strands of resin coated reinforcing fiber into the inlet opening between two continuous molding tracks having molding teeth comprising curved leading edges mounted thereon which mesh to form a molding cavity having longitudinal columns and transverse rows;
    (b) alternately rotating said continuous molding tracks to carry said strands longitudinally along the columns between said molding teeth and indexing said strands transversely along the rows between said molding teeth for a distance less than the transverse width of said grate structure to form a plastic reinforced grate structure comprising continuous strands of said fibers laced in a predetermined weaving pattern.

2. The process of claim 1 wherein said molding tracks are rotated and said strands are indexed in a weaving pattern comprising laying said strands along a portion of a first column for the length of two of said teeth, indexing said strands along a first row for the width of two of said teeth, laying said fiber in a portion of a second column, which is longitudinally disposed from said portion of said first column, along the length of two of said teeth, and indexing said strands back along a second row for the width of two teeth to return to said first column.

3. A fiber reinforcing plastic grate structure formed by the process of claim 1.

4. A process for producing elongated fiber reinforced structures which include transverse members comprising:
    (a) coating continuous strands of reinforcing fibers with a thermosetting plastic resin;
    (b) introducing said strands into upper and lower endless molding tracks comprising molding teeth having curved leading edges which mesh to form a molding cavity;
    (c) rotating said upper and lower endless molding tracks to form a molding cavity having said continuous strands contained longitudinally therein along a portion of the length of said molding tracks;
    (d) indexing said continuous strands transversely across said continuous molding track such that said strands lie both longitudinally and transversely within said molding cavity; and
    (e) heating said molding cavity to set said thermosetting resin and form said structure.

5. The process of claim 4 wherein said molding cavity is heated to a temperature in the range of from about 100° F. to about 350° F.

6. The process of claim 4 wherein said continuous molding tracks mesh at an angle of from about 1 to about 10 degrees to form said molding cavity.

7. The process of claim 4 wherein the dwell time of said strands within said molding cavity is at least about 2 minutes.

* * * * *